(12) United States Patent
Yasuda

(10) Patent No.: US 7,362,418 B2
(45) Date of Patent: Apr. 22, 2008

(54) DUPLICATE APPARATUS

(75) Inventor: Naohiro Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 11/142,454

(22) Filed: Jun. 2, 2005

(65) Prior Publication Data

US 2006/0055986 A1    Mar. 16, 2006

(30) Foreign Application Priority Data

Sep. 15, 2004 (JP) .............................. 2004-268838

(51) Int. Cl.
*G03B 27/04* (2006.01)
(52) U.S. Cl. ......................................... 355/97; 358/498
(58) Field of Classification Search ................. 355/97; 358/1.18, 498, 474; 399/365, 367, 88; 271/10.01, 271/298, 9.02
See application file for complete search history.

(56) References Cited

U.S. PATENT DOCUMENTS 5,710,959 A *  1/1998  Hirooka et al. ............... 399/88
6,315,280 B1 * 11/2001  Jang ........................... 271/9.02
2002/0089707 A1  7/2002  Yasuda
2005/0068583 A1 *  3/2005  Gutkowski et al. ........ 358/1.18
2005/0084170 A1  4/2005  Yasuda

FOREIGN PATENT DOCUMENTS

| JP | 8-214126 | 8/1996 |
|---|---|---|
| JP | 8-289053 | 11/1996 |
| JP | 2003-319116 | 11/2003 |

* cited by examiner

*Primary Examiner*—Peter B. Kim
(74) *Attorney, Agent, or Firm*—Oblon, Spivak, McClelland, Maier & Neustadt, P.C.

(57) ABSTRACT

A duplicate apparatus is disclosed that is able to reliably switch plural document feeding units without additional cost and has high accessibility. In the duplicate apparatus, an operations unit and a document reading unit are included in an operations-reading unit as one unit, and plural operations-reading units can be connected to the duplicate apparatus. A control unit enables one of the operations-reading units to operate via an image data selection unit and an operations selection unit.

14 Claims, 6 Drawing Sheets

| SIGNAL TYPE | SYMBOL | STATUS | DEFINITION |
|---|---|---|---|
| SWITCHING SIGNAL | SEL | 0 | SELECT OPERATION-READING UNIT |
| | | 1 | SELECT EXPANSION OPERATION-READING UNIT |
| DOCUMENT DETECTION SENSOR (A, B) | DTC_A | 0 | DOCUMENT ABSENT |
| | DTC_B | 1 | DOCUMENT PRESENT |
| ENERGY-SAVING MODE RECOVERY KEY (A, B) | RCV_A | 0 | NOT PRESSED |
| | RCV_B | 1 | PRESSED |

DUPLICATE APPARATUS

BACKGROUND OF THE INVENTION

1. Field of the Invention

The present invention relates to a duplicate apparatus, in particular, to a duplicate apparatus able to appropriately switch plural document reading devices at low cost.

2. Description of the Related Art

In recent and continuing years, it becomes more and more important world-wide to create an environment enabling disabled persons to work in the same way as able-bodied persons, and information processing apparatuses are also required to meet this need; for example, implementation of Rehabilitation Act Section 508 in the United States is a significant manifestation of this requirement. Concerning accessibility, Rehabilitation Act Section 508 requires that each Federal department or agency shall ensure, unless an undue burden would be imposed on the department or agency, that electronic and information technology allows individuals with disabilities to have access to and use of information and data that is comparable to the access to and use of the information and data by Federal employees who are not individuals with disabilities.

Manufacturers of the information processing apparatuses should provide apparatuses superior in accessibility to disabled persons, not only for meeting the requirements of delivery to official departments, but also for clarifying the stance of manufacturers on this issue. It can be said that making an active approach to accessibility for disabled persons is a social responsibility of the manufacturers.

In this situation, it is desired to develop a duplicate apparatus superior in accessibility. A typical problem in accessibility of the duplicate apparatus is to allow disabled persons, for example, a person in a wheelchair, to operate the duplicate apparatus without inconvenience.

The duplicate apparatuses which are presently widely used are designed for persons of usual stature, and the height of the duplicate apparatus is fixed. Especially, generally a document reading device is mounted on the top of the duplicate apparatus; hence, a person in a wheelchair has to operate the present duplicate apparatus from a low position. Due to this, it is not convenient for the disabled persons to set documents on the document reading devices or operate buttons on an operational panel. This is to say that conventional duplicate apparatuses are low in accessibility.

To solve this problem, for example, the document reading device is made detachable from the main body of the duplicate apparatus, and can be mounted to a side of the main body of the duplicate apparatus. In doing so, the document reading device is at a low position, and this enables a person to easily operate the duplicate apparatus from a low position.

However, such a duplicate apparatus suffers from high cost compared to usual duplicate apparatuses, and able-bodied persons feel inconvenienced to have to use the duplicate apparatus.

In other words, it is desirable to provide a duplicate apparatus of high accessibility while maintaining conventional operational feel and low cost.

It is known that in most cases the duplicate apparatus is used without the necessity of separating the document reading device, and it is quite rare to separate the document reading device in the use of the duplicate apparatus. Therefore, it is difficult for the manufacturers to make apparatuses adapted to handle the rare cases even with a rise in cost; further it is also difficult for customers to purchase such apparatuses.

Therefore, the issue is how to provide, at low cost, a duplicate apparatus superior in accessibility in any situation.

This object can be attained by adapting a conventional duplicate apparatus. For example, the conventional duplicate apparatus may be adapted so that, with the original document reading device being mounted on the main body of the duplicate apparatus, another document reading device can be attached to the duplicate apparatus by connecting the other document reading device to the main body of the duplicate apparatus with a connection cord. In doing so, it is not necessary to provide mechanisms for separating the document reading devices in all duplicate apparatuses. For example, ideally it is adequate to just provide an interface to enable physical connection. For users desiring to use the duplicate apparatus in the usual way, they can just use the duplicate apparatus as usual.

However, in order to realize a duplicate apparatus having the above configuration, in practice it is not sufficient to just provide a physical interface. For example, considering the situation in which plural document reading devices are used simultaneously, in this case it is necessary to install additional units for supplying power necessary to operate the document reading devices, and install image processing units or memories so that image data simultaneously output from the plural document reading devices can be processed appropriately.

On the other hand, for example, Japanese Laid Open Patent Application No. 8-214126 (referred to as "reference 1", hereinafter) discloses a duplicate apparatus including plural scanning devices for one document feeding device, and plural printing devices for recording image data obtained by the scanning devices.

In addition, Japanese Laid Open Patent Application No. 8-289053 (referred to as "reference 2", hereinafter) discloses a coupling unit of a digital duplicate apparatus that selects and executes one of a first mode for transferring image signals from one document reading device to plural image outputting units through a video bus, and a second mode for transferring image signals from plural document reading devices to one image outputting unit through the video bus.

However, the techniques disclosed in the above reference 1 and reference 2 both aim at improvements of processing performance; they allow selective usage of plural document reading devices, but cause rising cost.

SUMMARY OF THE INVENTION

It is a general object of the present invention to solve one or more problem of the related art.

A more specific object of the present invention is to provide a duplicate apparatus having high accessibility by allowing reliable connection of a reading unit to the duplicate apparatus for use of disabled persons without additional cost.

According to a first aspect of the present invention, there is provided a duplicate apparatus, comprising plural document feeding units each configured to feed documents; and a control unit configured to control reading of images on the documents fed by the document feeding units and recording and outputting of the images to a recording medium.

As an embodiment, the document feeding units are arranged at different heights.

As an embodiment, the control unit selectively directs one of the document feeding units to operate.

As an embodiment, the duplicate apparatus further comprises plural image reading units configured to read the images on the documents fed by the document feeding units, respectively, the image reading units being arranged in correspondence to the document feeding units, respectively, wherein the control unit receives image data from the image reading units.

Alternatively, as an embodiment, the duplicate apparatus comprises an image reading unit configured to read an image on a document fed by one of the document feeding units, wherein the control unit receives image data from the image reading unit.

When the duplicate apparatus includes plural image reading units, as an embodiment, the control unit selectively receives image data from the image reading units.

As an embodiment, the duplicate apparatus further comprises a document reading unit; an operations unit, said operations unit and the document reading unit being integrated as an operations-reading unit; and a printing-output unit, wherein the control unit, in response to operations on the operations unit, directs the document reading unit to read the image data of the documents, and directs the printing-output unit to record and output the image data read by the document reading unit to a sheet.

As an embodiment, the duplicate apparatus comprises a selection unit that allows plural operations-reading units to be connected to the duplicate apparatus, and enables one of the operations-reading units to operate, wherein the control unit directs the selection unit to enable one of the operations-reading units to operate.

As an embodiment, each of the operations-reading units includes a state detection unit configured to detect whether the corresponding operations-reading unit is in a usable state or in a standby state, wherein the control unit disables the enabled operations-reading unit through the selection unit only when the state detection unit detects that the corresponding operations-reading unit is in the standby state.

As an embodiment, each of the operations-reading units includes a switching request unit configured to request to enable the corresponding operations-reading unit, wherein the control unit enables the corresponding operations-reading unit in response to a request from the switching request unit.

As an embodiment, each of the operations-reading units includes a document detection unit configured to detect whether a document is set in the document reading unit; and the corresponding state detection unit serves as the document detection unit.

As an embodiment, the duplicate apparatus further comprises a recovery request unit that has an energy-saving mode for reducing electrical power in a standby state, and directs recovery from the energy-saving mode, wherein the switching request unit serves as the recovery request unit.

According to a second aspect of the present invention, there is provided a duplicate apparatus comprising plural operations units configured to output signals corresponding to operations thereto; and plural control units that, in response to the operations on the operations units, control reading images on documents fed by document feeding units and recording and outputting the images to a recording medium.

As an embodiment, the operations units are arranged at different heights.

As an embodiment, the control units selectively receive signals from the operations units.

According to the above invention, because plural document feeding units are provided, or an operations unit and a document reading unit are integrated to be an operations-reading unit, and the images to be duplicated are formed based on documents read by the document feeding units or the operations-reading unit, it is possible to provide a duplicate apparatus having high accessibility and allowing reliable connection of a reading unit to the duplicate apparatus for use of disabled persons, for example, those in wheel chairs, but without additional cost.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention will be explained with reference to the accompanying drawings.

First Embodiment

Figure 1:
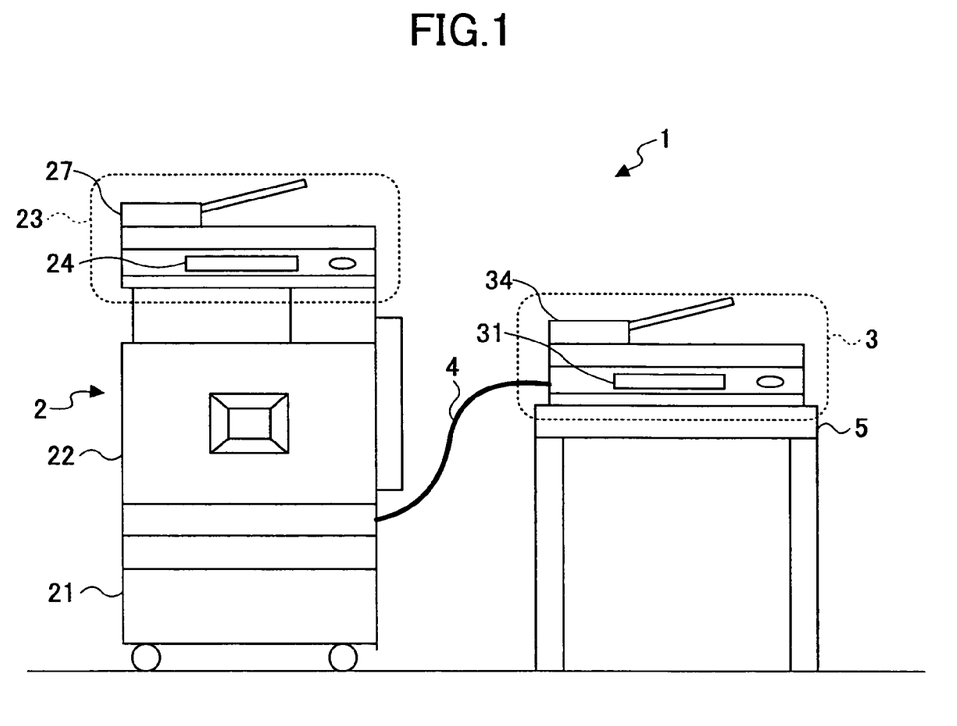
FIG. 1 is a schematic front view of a duplicate apparatus 1 according to a first embodiment of the present invention.

FIG. 1 is a schematic front view of a duplicate apparatus 1 according to a first embodiment of the present invention.

Figure 2:
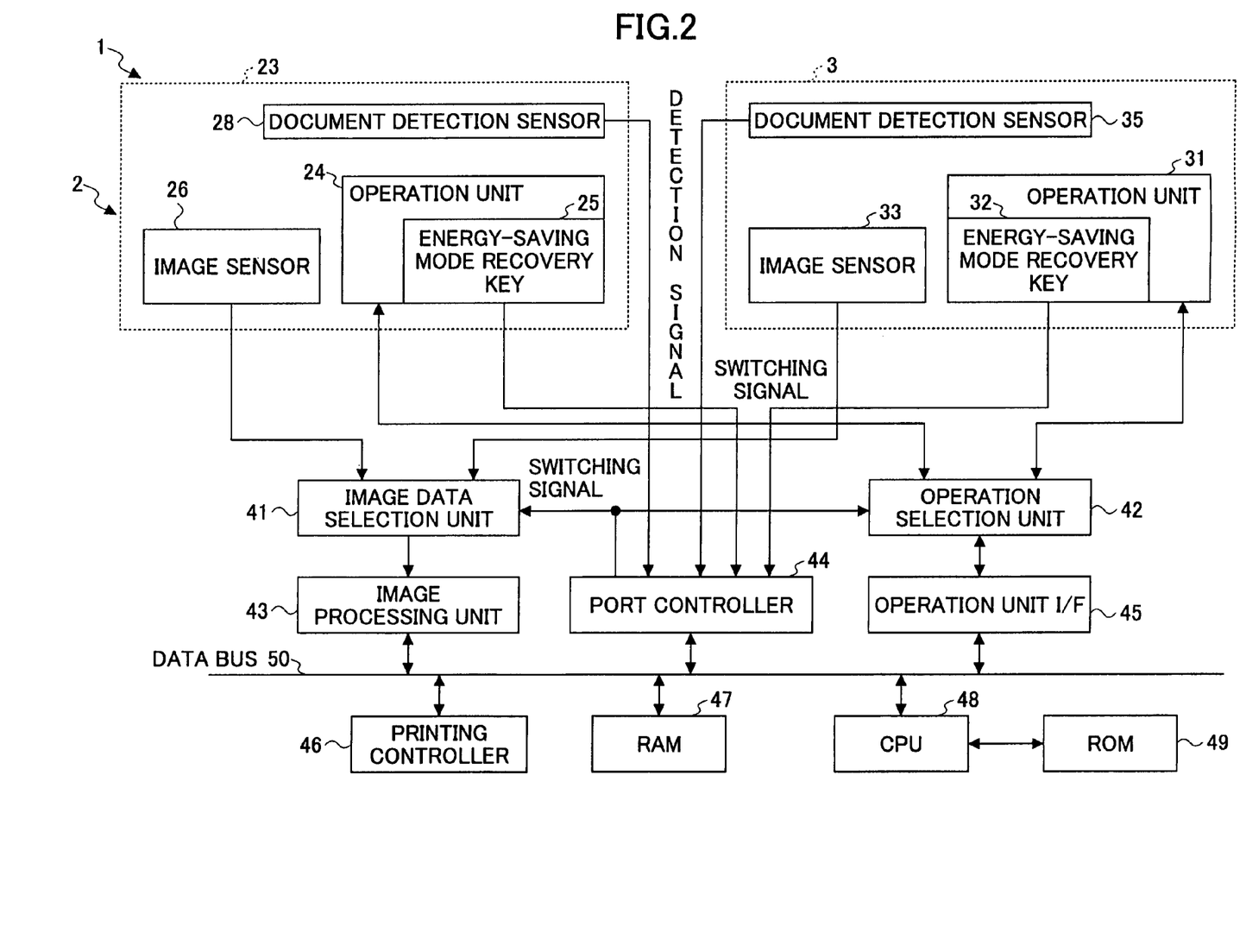
FIG. 2 is a block diagram illustrating a principal portion of the duplicate apparatus 1 according to the first embodiment of the present invention.

FIG. 2 is a block diagram illustrating a principal portion of the duplicate apparatus 1 according to the first embodiment of the present invention.

As illustrated in FIG. 1, the duplicate apparatus 1 includes a main body 2 and an expansion operations-reading unit 3, the main body 2 and the expansion operations-reading unit 3 being connected by a cable 4.

A paper feed tray 21 is at the bottom of the main body 2, a printing unit 22 is on the paper feed tray 21, and an operations-reading unit 23 is on the printing unit 22. The paper feed tray 21 includes plural paper cassettes each accommodating plural sheets of paper. From each of the paper cassettes, paper having a size corresponding to the size of a document or an enlarged or reduced document is conveyed to the printing unit 22 sheet by sheet.

The printing unit 22, for example, is an electrophotographic printing device, forms an image on a sheet of paper fed by the paper feed tray 21 based on data of the image on the document read by the expansion operations-reading unit 3 or the operations-reading unit 23, and delivers the sheet of paper with an image thereon to a not-illustrated delivery tray.

The operations-reading unit 23 has an operations unit 24 on the front side surface thereof, as shown in FIG. 1, and various buttons are provided in the operations unit 24 for performing various controls necessary to operations of the duplicate apparatus 1, and in particular, operations of reading and duplicating the document by using the operations-reading unit 23. For example, an energy-saving mode recovery key 25 (refer to FIG. 2) is provided in the operations unit 24, which directs operations of recovery from the energy-saving mode (a mode with reduced power consumption). The energy-saving mode recovery key 25 corresponds to the switching request unit and the recovery request unit in claims. The operations unit 24 further includes a display for displaying various messages.

The operations-reading unit 23 is arranged at a height suitable for operations by able-bodied persons. That is, the operations-reading unit 23 includes the operations unit 24 and a document reading unit as one unit.

For example, the operations-reading unit 23 operates as an image scanner by using an image sensor 26, as illustrated in FIG. 2. The operations-reading unit 23 has an Auto Document Feeder (ADF) 27, and documents can be set thereon. The ADF 27 feeds the documents set thereon one by one to a document reading position in the operations-reading unit 23.

The operations-reading unit 23 scans the documents fed in by the ADF 27 one by one to read images on the documents at a specified DPI (dots per inch), and outputs the obtained image data.

The ADF 27 is provided above a contact glass while being able to be opened and closed. A page of a book can be placed on the contact glass. In this case, the image sensor 26 can scan the page of the book placed on the contact glass in a main-scanning direction and a sub-scanning direction to read the image on the document.

That is, the operations-reading unit 23 can read pages of a book placed on the contact glass (referred to as "book reading mode" below), and can read documents set on the ADF 27 (referred to as "ADF reading mode" below).

In addition, as illustrated in FIG. 2, the operations-reading unit 23 includes a document detection sensor 28. In the ADF reading mode, the document detection sensor 28 detects whether a document is set on the ADF 27, and in the book reading mode, the document detection sensor 28 detects whether a document is set on the contact glass.

The expansion operations-reading unit 3 is placed on a stand 5, for example, a desk, and at a height suitable for operations by persons in wheel chairs or persons of small stature.

The configuration of the expansion operations-reading unit 3 is basically the same as that of the operations-reading unit 23. Specifically, the expansion operations-reading unit 3 has an operations unit 31 on the front side surface thereof, as shown in FIG. 1, and various buttons are provided in the operations unit 31 for performing various controls necessary to operations of the duplicate apparatus 1, and in particular, operations of reading and duplicating the document by using the expansion operations-reading unit 3. For example, an energy-saving mode recovery key 32 (refer to FIG. 2) is provided in the operations unit 31, which directs operations of recovery from the energy-saving mode (a mode with reduced power consumption). The energy-saving mode recovery key 32 corresponds to a switching request unit and a recovery request unit. The operations unit 31 further includes a display for displaying various messages. That is, the expansion operations-reading unit 3 includes the operations unit 31 and a document reading unit as one unit.

For example, the expansion operations-reading unit 3 operates as an image scanner by using an image sensor 33, as illustrated in FIG. 2. The expansion operations-reading unit 3 has an Auto Document Feeder (ADF) 34, and documents can be set thereon. The ADF 34 feeds the documents set thereon one by one to a document reading position in the expansion operations-reading unit 3.

The expansion operations-reading unit 3 scans the documents fed in by the ADF 34 one by one to read images on the documents at a specified DPI (dots per inch), and outputs the obtained image data.

The ADF 34 is provided above a contact glass while being able to be opened and closed. A page of a book can be placed on the contact glass. In this case, the image sensor 33 can scan the page of the book placed on the contact glass in a main-scanning direction and a sub-scanning direction to read the image on the document.

That is, the expansion operations-reading unit 3 can read pages of a book placed on the contact glass (referred to as "book reading mode" below), and can read documents set on the ADF 34 (referred to as "ADF reading mode" below).

In addition, as illustrated in FIG. 2, the expansion operations-reading unit 3 includes a document detection sensor 35. In the ADF reading mode, the document detection sensor 35 detects whether a document is set on the ADF 34, and in the book reading mode, the document detection sensor 35 detects whether a document is set on the contact glass.

As illustrated in FIG. 2, in addition to the expansion operations-reading unit 3 and the operations-reading unit 23, the duplicate apparatus 1 further includes an image data selection unit 41, an operations selection unit 42, an image processing unit 43, a port controller 44, an operations unit I/F 45, a printing controller 46, a RAM (Random Access Memory) 47, a CPU (Central Processing Unit) 48, and a ROM (Read Only Memory) 49.

In the ROM 49, there are stored various programs, such as basic control programs of the duplicate apparatus 1, control programs for switching the operations-reading units 3, 23, and various kinds of data necessary for execution of these programs.

Based on the programs in the ROM 49 and with the RAM 47 as a working memory, the CPU 48 controls components of the duplicate apparatus 1 to execute various basic operations of the duplicate apparatus 1, and controls the operation of switching the operations-reading units 3, 23.

The image data selection unit 41 corresponds to a portion of a selection unit. The image data from the image sensor 26 of the operations-reading unit 23 and the image sensor 33 of the expansion operations-reading unit 3 are input to the image data selection unit 41. In response to a selection signal from the port controller 44, the image data selection unit 41 selects one of the image data from the image sensor 26 of the operations-reading unit 23 and the image data from the image sensor 33 of the expansion operations-reading unit 3, and outputs the image data to the image processing unit 43.

The image processing unit 43 performs various processing on the image data output from the image data selection unit 41.

In response to a control signal from the CPU 48, the printing controller 46 controls the paper feed tray 21 and the printing unit 22 to record and output images on sheets of paper based on the image data of images on documents read by the expansion operations-reading unit 3 or the operations-reading unit 23. Here, the image data are those selected by the image data selection unit 41 and processed by the image processing unit 43.

The operations selection unit 42 corresponds to a portion of a selection unit. The operations selection unit 42 is connected to the operations unit 24 of the operations-reading unit 23 and the operations unit 31 of the expansion operations-reading unit 3. Under controls of the port controller 44, the operations selection unit 42 directs the selection of the operations of the operations unit 24 or the operations of the operations unit 31, informs the CPU 48 through the operations unit I/F 45 of the selection, and outputs signals from the CPU 48 to the operations unit 24 or the operations unit 31.

The port controller 44 has functions of an output port. In accordance with instructions from the CPU 48, the port controller 44 outputs selection signals to the image data selection unit 41 and the operations selection unit 42 to control the image data selection by the image data selection unit 41 and control the operations selection by the operations selection unit 42. The detection signal from the document detection sensor 28 of the operations-reading unit 23 and the operation signal from the energy-saving mode recovery key 25 of the operations unit 24 are input to the port controller 44, and the detection signal from the document detection sensor 35 of the operations-reading unit 3 and the operations signal from the energy-saving mode recovery key 32 of the operations unit 31 are input to the port controller 44.

The port controller 44 also has functions of an input port. The port controller 44 converts the detection signal from the document detection sensor 28 of the operations-reading unit 23, the operations signal from the energy-saving mode recovery key 25 of the operations unit 24, the detection signal from the document detection sensor 35 of the operations-reading unit 3, and the operations signal from the energy-saving mode recovery key 32 of the operations unit 31 to data recognizable by the CPU 48, and outputs the data to the CPU 48.

Figure 3:
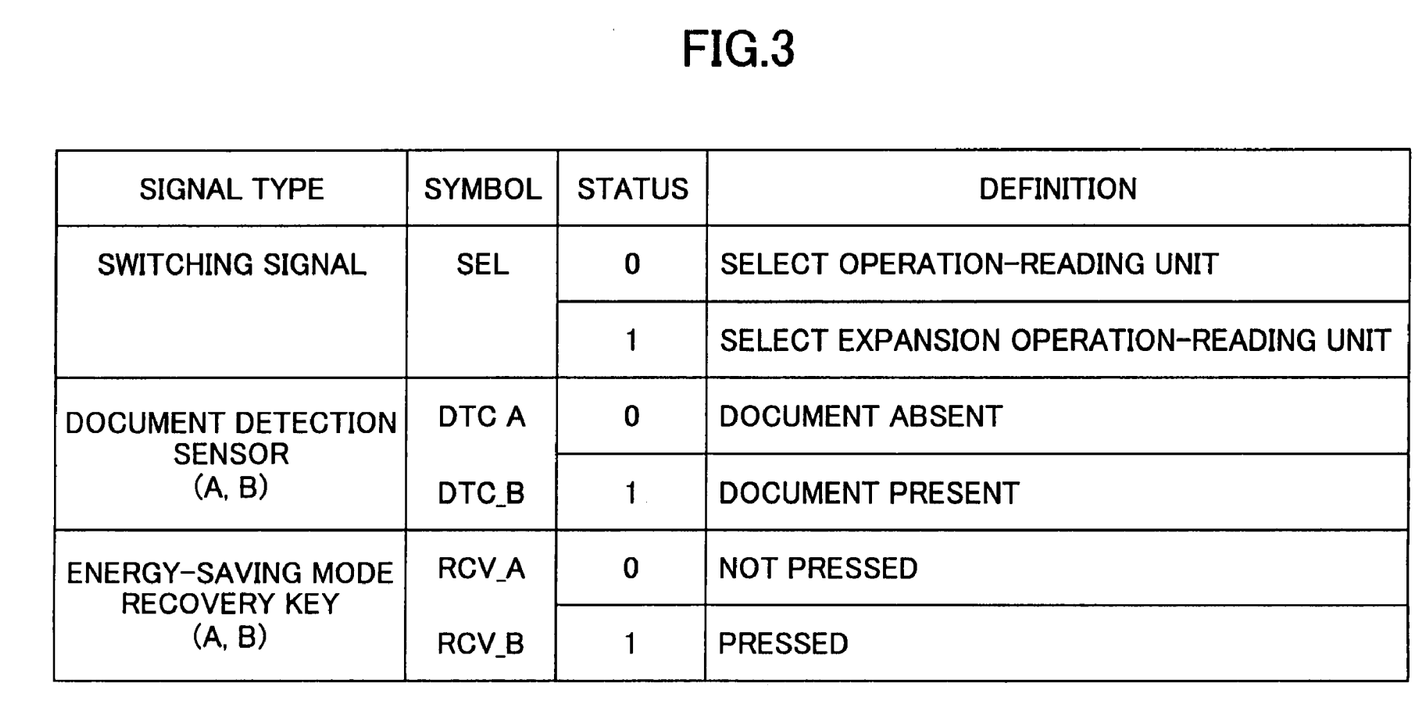
FIG. 3 is a table explaining signals in the duplicate apparatus 1 shown in FIG. 2.

FIG. 3 is a table explaining signals in the duplicate apparatus 1 shown in FIG. 2.

In FIG. 3, the detection signal from the document detection sensor 28 of the operations-reading unit 23 is denoted to be DTC_A, and when DTC_A is in a "0" state, it means "no document", whereas when DTC_A is in a "1" state, it means "a document is present".

Similarly, the detection signal from the document detection sensor 35 of the expansion operations-reading unit 3 is denoted to be DTC_B, and when DTC_B is in a "0" state, it means "no document", whereas when DTC_B is in a "1" state, it means "a document is present".

The selection signal output from the port controller 44 to the image data selection unit 41 and the operations selection unit 42 is denoted to be SEL, and when SEL is in a "0" state, it means to select the operations-reading unit 23, whereas when SEL is in a "1" state, it means to select the expansion operations-reading unit 3.

The operations signal from the energy-saving mode recovery key 25 of the operations-reading unit 23 is denoted to be RCV_A, and when RCV_A is in a "0" state, it means that "the energy-saving mode recovery key 25 is not pressed", whereas when RCV_A is in a "1" state, it means that "the energy-saving mode recovery key 25 is pressed".

Similarly, the operations signal from the energy-saving mode recovery key 32 of the expansion operations-reading unit 3 is denoted to be RCV_B, and when RCV_B is in a "0" state, it means that "the energy-saving mode recovery key 32 is not pressed", whereas when RCV_B is in a "1" state, it means that "the energy-saving mode recovery key 32 is pressed".

In order to reduce the total power consumption of the duplicate apparatus 1, the duplicate apparatus 1 can operate in the energy-saving mode, in which output of the power supply of the duplicate apparatus 1 is controlled. When a user pushes the energy-saving mode recovery key 25 of the operations unit 24 of the operations-reading unit 23, or the energy-saving mode recovery key 32 of the operations unit 31 of the expansion operations-reading unit 3, the operations signal is sent to the CPU 48 via the port controller 44, and under control of the CPU 48, the duplicate apparatus 1 is recovered (returned to normal mode) from the energy-saving mode.

Therefore, in the duplicate apparatus 1, even in the energy-saving mode, electric power is supplied to the components of the duplicate apparatus 1 used for recognizing operations of the energy-saving mode recovery key 25 or the energy-saving mode recovery key 32 and in recovery from the energy-saving mode.

The CPU 48 regards the operation of the energy-saving mode recovery key 25 or the energy-saving mode recovery key 32 as a request from the operations-reading unit 23 or the expansion operations-reading unit 3 for enabling the operations-reading unit 23 or the expansion operations-reading unit 3, which are disabled presently. In response to the request and depending on which of the energy-saving mode recovery key 25 or the energy-saving mode recovery key 32 is pushed, the duplicate apparatus 1 adopts the operations-reading unit 23 or the expansion operations-reading unit 3 as a valid operations-reading unit.

In the above, when the energy-saving mode recovery key 25 or the energy-saving mode recovery key 32 is used to make the enabling request, it is assumed implicitly that the disabled state is equivalent to the energy-saving state from the point of view of power supplying, but the disabled state is not limited to the energy-saving state, and can be other states.

In addition, in the above, it is described that the operation of pressing the energy-saving mode recovery key 25 of the operations unit 24 or the energy-saving mode recovery key 32 of the operations unit 31 is used as the trigger for recovering from the energy-saving mode. But the trigger for recovering from the energy-saving mode is not limited to the operation of pressing the energy-saving mode recovery key 25 or the energy-saving mode recovery key 32. For example, setting of documents on the operations-reading unit 23 or the expansion operations-reading unit 3 can also be used as the trigger for recovering from the energy-saving mode, and this trigger can be used as the request for enabling the operations-reading unit 23 or the expansion operations-reading unit 3.

According to the present embodiment, the duplicate apparatus 1 includes the main body 2 and the expansion operations-reading unit 3, and the expansion operations-reading unit 3 is connected to the main body 2 by the cable 4. The expansion operations-reading unit 3 is placed on the stand 5 and at a height suitable for operations by persons in wheel chairs or persons of small stature. The expansion operations-reading unit 3 has the same configuration as that of the operations-reading unit 23 which is provided in the main body 2.

The main body 2 includes the image data selection unit 41 which selects the image data from the image sensor 26 of the operations-reading unit 23 or the image data from the image sensor 33 of the expansion operations-reading unit 3 and outputs the image data to the image processing unit 43, the operations selection unit 42 which selectively connects the operations unit 24 of the operations-reading unit 23 or the operations unit 31 of the expansion operations-reading unit 3 to the operations unit I/F 45, the image processing unit 43, and the port controller 44 which converts the detection signal from the document detection sensor 28 of the operations-reading unit 23, the operations signal from the energy-saving mode recovery key 25 of the operations unit 24, the detection signal from the document detection sensor 35 of the operations-reading unit 3, and the operations signal from the energy-saving mode recovery key 32 of the operations unit 31 to data recognizable by the CPU 48, and outputs the data to the CPU 48.

When a user operates the energy-saving mode recovery key 25 of the operations-reading unit 23 or the energy-saving mode recovery key 32 of the expansion operations-reading unit 3, the operations signal from the energy-saving mode recovery key 25 of the operations-reading unit 23 or the energy-saving mode recovery key 32 of the expansion operations-reading unit 3 is sent to the CPU 48 via the port controller 44, the CPU 48 regards the operations of the energy-saving mode recovery key 25 or the energy-saving mode recovery key 32 as a request for changing the operations-reading unit 23 or the expansion operations-reading unit 3. Based on the detection signal from the document detection sensor 28 of the operations-reading unit 23 or the detection signal from the document detection sensor 35 of the operations-reading unit 3 before the selection operation, the CPU 48 confirms whether the operations-reading unit 23 or the operations-reading unit 3 before the selection operation is in use. If the operations-reading unit 23 or the operations-reading unit 3 before the selection operation is in use, the CPU 48 waits until the use is finished, and then performs the operations-reading unit selection operations to switch the operations-reading unit 23 and the expansion operations-reading unit 3.

Figure 4:
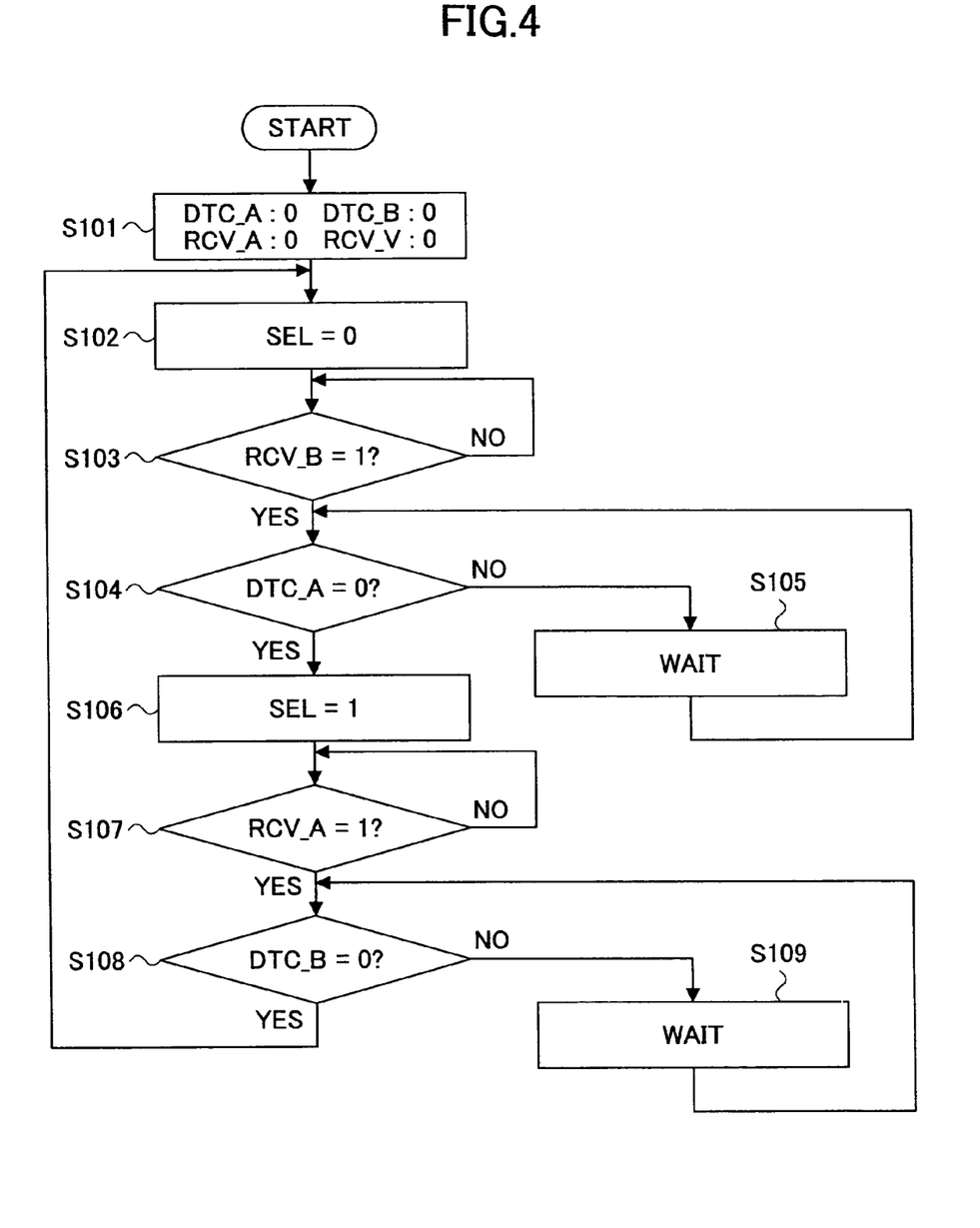
FIG. 4 is a flowchart illustrating the operations-reading unit selection operations in the duplicate apparatus 1 shown in FIG. 1.

FIG. 4 is a flowchart illustrating the operations-reading unit selection operations in the duplicate apparatus 1 shown in FIG. 1.

In step S101, the duplicate apparatus 1 is in an initial state. Here, it is assumed that in the initial state, all of the detection signal DTC_A from the document detection sensor 28 of the operations-reading unit 23, the detection signal DTC_B from the document detection sensor 35 of the expansion operations-reading unit 3, the operations signal RCV_A from the energy-saving mode recovery key 25 of the operations-reading unit 23, and the operations signal RCV_B from the energy-saving mode recovery key 32 of the expansion operations-reading unit 3 are in the "0" state.

In step S102, the CPU 48 outputs the selection signal SEL in the "0" state to enable the operations-reading unit 23.

In step S103, the CPU 48 determines whether there is a selection request from the expansion operations-reading unit 3 in the initial state, that is to say, whether the operations signal RCV_B from the energy-saving mode recovery key 32 of the expansion operations-reading unit 3 is in a "1" state.

In step S104, if it is determined that there is a selection request from the expansion operations-reading unit 3 in step S103, the CPU 48 determines whether the operations-reading unit 23, which is enabled presently, is in use by determining whether the detection signal DTC_A from the document detection sensor 28 of the operations-reading unit 23 is in the "0" state.

In step S105, if it is determined in step S104 that the detection signal DTC_A is in the "0" state, namely, the operations-reading unit 23, which is enabled presently, is in use, the CPU 48 waits for a preset time period (wait), and then repeats step S104 to determine again whether the detection signal DTC_A from the document detection sensor 28 of the operations-reading unit 23 is in the "0" state.

In step S106, if it is determined that the detection signal DTC_A is in the "0" state in step S104, that is, documents are not set in the operations-reading unit 23, and thus the operations-reading unit 23 is not in use presently, the CPU 48 sets the selection signal SEL to the "1" state to select the expansion operations-reading unit 3, disable the operations-reading unit 23, and enable the expansion operations-reading unit 3. In such a state, the expansion operations-reading unit 3 is usable.

In step S107, after the expansion operations-reading unit 3 is enabled, the CPU 48 determines whether there is a selection request from the operations-reading unit 23, that is, whether the operations signal RCV_A from the energy-saving mode recovery key 25 of the operations-reading unit 23 is in a "1" state.

In step S108, if it is determined that there is a selection request from the operations-reading unit 23 in step S107, the CPU 48 determines whether the expansion operations-reading unit 3, which is enabled presently, is in use by determining whether the detection signal DTC_B from the document detection sensor 35 of the expansion operations-reading unit 3 is in the "0" state.

In step S109, if it is determined in step S108 that the detection signal DTC_B is in the "1" state, namely, the expansion operations-reading unit 23, which is enabled presently, is in use, the CPU 48 waits for a preset time period (wait), and then repeats step S108 to determine again whether the detection signal DTC_B from the document detection sensor 35 of the expansion operations-reading unit 3 is in the "0" state.

If it is determined in step S108 that the detection signal DTC_B is in the "1" state, that is, documents are not set in the expansion operations-reading unit 3, and thus the expansion operations-reading unit 3 is not in use presently, the CPU 48 sets the selection signal SEL to the "0" state to select the operations-reading unit 23, disable the expansion operation-reading unit 3, and enable the operations-reading unit 23. In such a state, the operations-reading unit 23 is usable.

As described above, the CPU 48 monitors the selection request from the expansion operations-reading unit 3 and the operations-reading unit 23 when they are disabled by using presence or absence of operations of the energy-saving mode recovery keys 32 and 25, respectively; once the selection request is detected, the CPU 48 confirms the present operation state of the operations-reading unit 23 or the expansion operations-reading unit 3, which is enabled presently, by using the document detection sensor 28 or 35, and only when it is determined that documents are not set in the operations-reading unit 23 or the expansion operations-reading unit 3, namely, the operations-reading unit 23 or the expansion operations-reading unit 3 is on standby, the operations-reading unit 23 or the expansion operations-reading unit 3 that makes the selection request is enabled.

In this way, in the duplicate apparatus 1 of the present embodiment, the operations unit 24 and a document reading unit are included in the operations-reading unit 23 as one unit, and the operations unit 31 and a document reading unit are included in the expansion operations-reading unit 3 as one unit. The duplicate apparatus 1 of the present embodiment allows plural operations-reading units 23 and 3 to be connected thereto, and the CPU 48 enables one of the operations-reading units connected to the duplicate apparatus 1 to operate via the image data selection unit 41 and the operations selection unit 42.

As a result, without adding new functions or devices for coping with the situation in which plural operations-reading units 23 and 3 are used simultaneously, it is possible to provide a duplicate apparatus having high accessibility and allowing reliable connection of the operations-reading units 23 and 3 to the duplicate apparatus 1 for use of disabled persons without additional cost.

In addition, in the duplicate apparatus 1 of the present embodiment, the operations-reading unit 23 and the operations-reading unit 3 include the document detection sensor 28 and the document detection sensor 35, respectively, which detect whether the corresponding operations-reading unit is in a usable state or in a standby state, the CPU 48 disables the enabled operations-reading unit 23 or 3 through the image data selection unit 41 or the operations selection unit 42 only when the document detection sensor 28 or the document detection sensor 35 detects that the operations-reading unit 23 or 3 is in the standby state.

As a result, it is possible to prevent troubles occurring when the operations-reading unit 23 or 3 being used is disabled, for example, failures in duplication operations when using the operations-reading unit 23 or 3, such as damage to parts, destruction of data being processed, or destruction of original documents. Due to this, accessibility of the duplicate apparatus is improved further without additional cost.

In addition, in the duplicate apparatus 1 of the present embodiment, the operations-reading unit 23 and the operations-reading unit 3 include the energy-saving mode recovery keys 25 and 32, respectively, which request to enable the operations-reading unit 23 or 3. When a request to enable the operations-reading unit 23 or 3 is detected from the energy-saving mode recovery key 25 or 32, the CPU 48 enables the operations-reading unit 23 or the expansion operations-reading unit 3, which made the request, in response to the request.

As a result, even when the operations-reading unit 23 or 3, which one desires to use, is disabled, without moving to the main body 2 of the duplicate apparatus 1 from the disabled operations-reading unit 23 or 3, the user can just press the energy-saving mode recovery key 25 or 32 on the operation-reading unit 23 or 3 to enable the operations-reading unit 23 or 3. Due to this, the duplicate apparatus 1 of the present embodiment is more convenient for use, and accessibility of the duplicate apparatus is improved further without additional cost.

In addition, in the duplicate apparatus 1 of the present embodiment, because the document detection sensor 28 and the document detection sensor 35 are used to detect whether the operations-reading unit 23 or the operations-reading unit 3 is in a usable state or in a standby state, it is possible to detect the usage state of the operations-reading unit 23 or the operations-reading unit 3 with the existing document detection sensors 28, 35, without the necessity of providing additional mechanisms. Due to this, accessibility of the duplicate apparatus 1 is improved further without additional cost.

In addition, in the duplicate apparatus 1 of the present embodiment, because the energy-saving mode recovery keys 25 and 32 are used to make a request to enable the operations-reading unit 23 or 3, it is possible to make the request by just operating the energy-saving mode recovery key 25 or 32 of the disabled operations-reading unit 23 or 3 to enable the operations-reading unit 23 or 3 without the necessity of providing additional mechanisms. Due to this, the duplicate apparatus 1 of the present embodiment is more convenient to use, and accessibility of the duplicate apparatus 1 is improved further without additional cost.

It should be noted that the present embodiment is not limited to the above specific examples. For example, it is described above that in addition to the operations-reading unit 23 in the main body 2 of the duplicate apparatus 1, only one expansion operations-reading unit 3 is connected to the duplicate apparatus 1, but plural expansion operations-reading units 3 can be connected to the duplicate apparatus 1.

Second Embodiment

Figure 5:
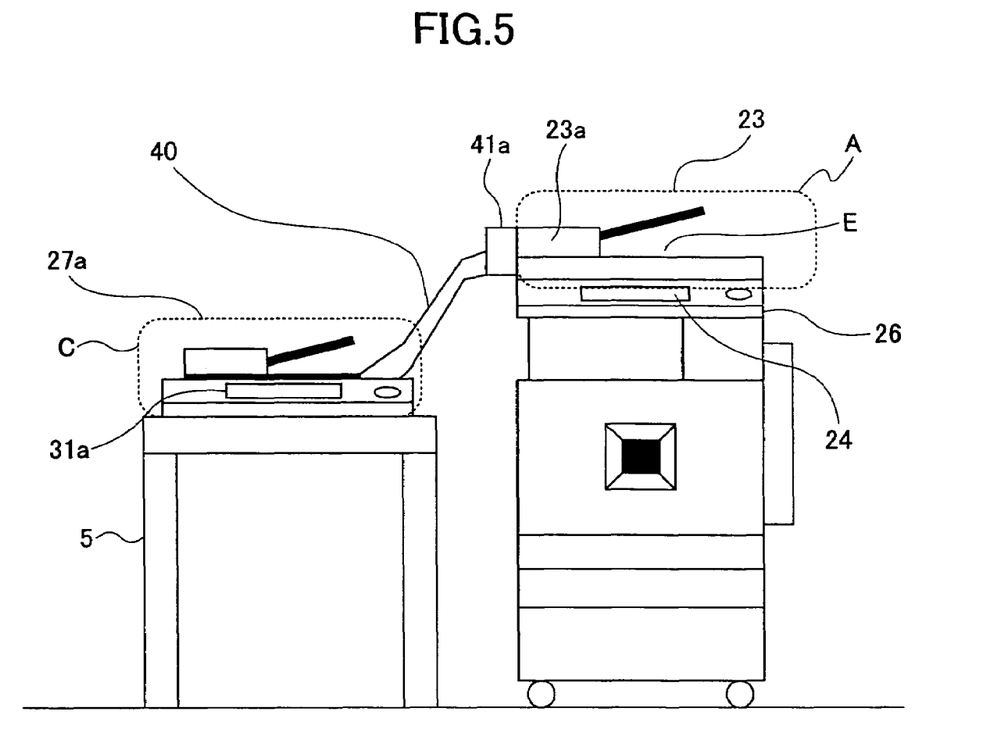
FIG. 5 is a schematic front view of a duplicate apparatus according to a second embodiment of the present invention.

FIG. 5 is a schematic front view of a duplicate apparatus according to a second embodiment of the present invention.

Figure 6:
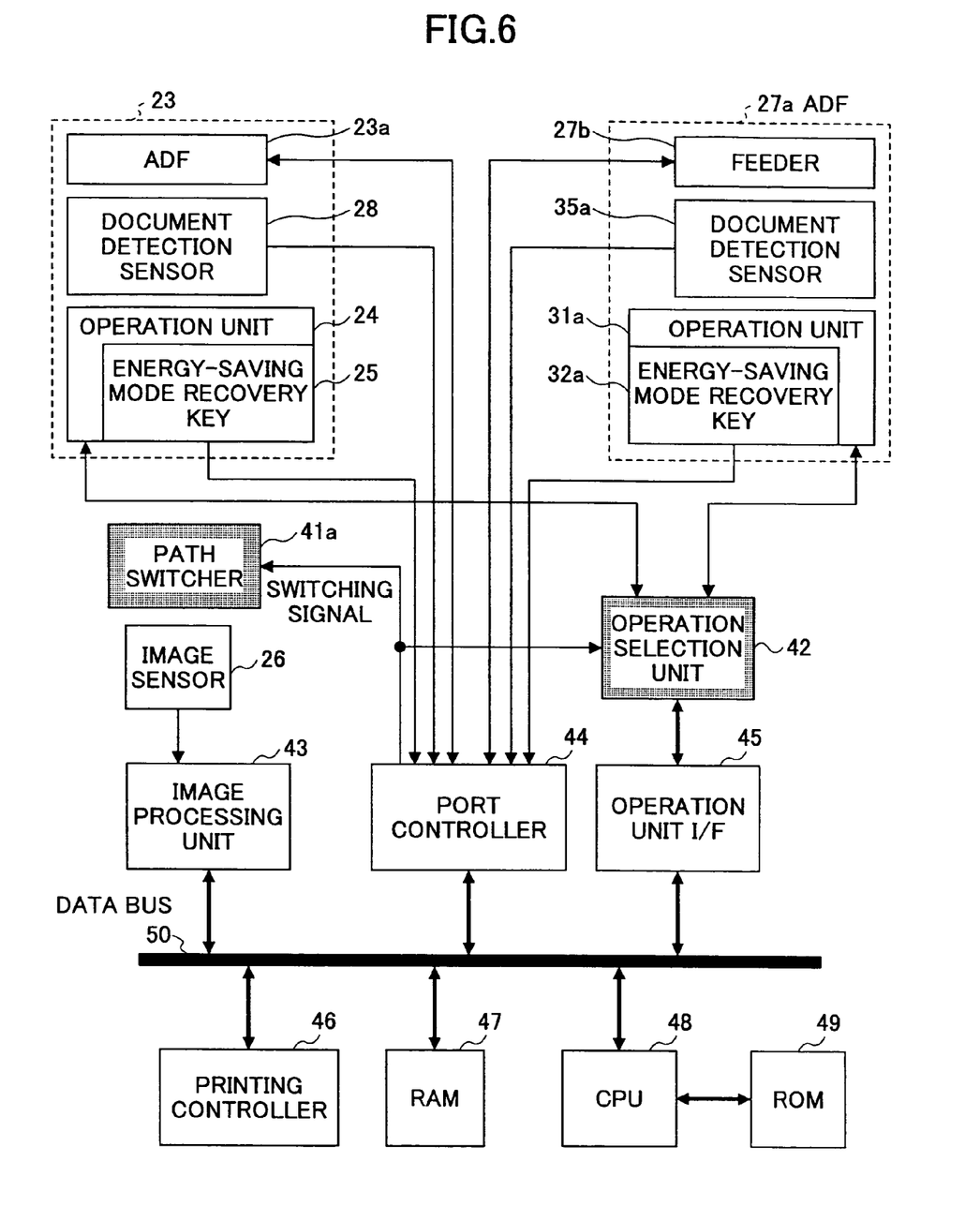
FIG. 6 is a block diagram illustrating a principal portion of the duplicate apparatus according to the second embodiment of the present invention.

FIG. 6 is a block diagram illustrating a principal portion of the duplicate apparatus according to the second embodiment of the present invention.

In this embodiment, as a document feed section of the operations-reading unit 23, an external document feed unit is provided, and documents fed by the external document feed unit are read by the image sensor of the operations-reading unit 23. In the following descriptions, the same reference numbers are assigned to the same elements as those described in the first embodiment, and overlapping descriptions are omitted.

As illustrated in FIG. 5, similar to the expansion operations-reading unit 3 in the first embodiment, an additional ADF 27a having similar functions to the ADF 27 is placed on a stand 5 to serve as the document feed section of the operations-reading unit 23. The ADF 27a is arranged at a height suitable for operations by persons in wheel chairs or persons of small stature.

In addition, a document conveying path 40 is provided for conveying documents from the ADF 27a to a document reading position of the image sensor 26 in the operations-reading unit 23. Because the conveying path of the ADF 27a is used to convey documents from the document conveying path 40 to a document reading position of the image sensor 26, at the cross point of the two conveying paths, a path switcher 41a is installed to switch the document conveying path. For example, the path switcher 41a has a switching jaw, and uses the switching jaw to change the conveying path. Further, for example, the switching jaw is driven by a solenoid controlled by a switching signal output from the CPU 48.

The ADF 27a, similar to the operations-reading unit 23, includes a feeder 27b (refer to FIG. 6), a document detection sensor 35a, an operations unit 31a, and an energy-saving mode recovery key 32a. From the operations unit 31a, for example, a user operates the duplicate apparatus as desired while sitting in a wheel chair, and feeds documents from the ADF 27a to the operations-reading unit 23 to allow the image sensor 26 to read images on the documents.

In this process, when reading documents from the ADF 27a, the path switcher 41a opens the conveying path on the side of the document conveying path 40, and closes the conveying path from the ADF 23a of the operations-reading unit 23 to direct the documents from the ADF 27a to the document reading position of the image sensor 26.

On the other hand, when using the duplicate apparatus at the usual high position, the path switcher 41a closes the conveying path on the side of the document conveying path 40, and opens the conveying path from the ADF 23a of the operations-reading unit 23 to direct the documents from the ADF 23a of the operations-reading unit 23 to the document reading position of the image sensor 26.

Certainly, documents set on the ADF 27a at a low position can be conveyed by operating the operations unit 24 of the operations-reading unit 23 at a high position.

For example, the documents fed from the ADF 27a are delivered to a delivery tray E of the operations-reading unit 23 at a high position.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

The present invention is applicable to a duplicate apparatus including plural operations-reading units to improve accessibility.

This patent application is based on Japanese priority patent application No. 2004-268838 filed on Sep. 15, 2004, the entire contents of which are hereby incorporated by reference.

What is claimed is:

1. A duplicate apparatus, comprising:
   a plurality of document feeding units each configured to feed documents;
   a control unit configured to control reading of images on the documents fed by the document feeding units and recording and outputting of the images to a recording medium; and
   a plurality of operations-reading units that allow operations by a user and that read image data of the documents, wherein each of the operations-reading units includes:
   a switching request unit configured to request the control unit to enable said operations-reading unit, and
   a state detection unit configured to detect whether said operations-reading unit is in usage or in standby;
   wherein
   the control unit directs the state detection units to detect states of enabled of the operations-reading units when a switching request of a disabled operations-reading unit requests the control unit to enable said disabled operations-reading unit, and
   the control unit enables said disabled operations-reading unit when said enabled operations-reading units are detected as in standby.

2. The duplicate apparatus as claimed in claim 1, wherein the document feeding units are arranged at different heights.

3. The duplicate apparatus as claimed in claim 1, wherein the control unit selectively directs one of the document feeding units to operate.

4. The duplicate apparatus as claimed in claim 1, further comprising:
   a plurality of image reading units configured to read the images on the documents fed by the document feeding units, said image reading units being arranged in correspondence to the document feeding units,
   wherein
   the control unit receives image data from the image reading units.

5. The duplicate apparatus as claimed in claim 4, wherein the control unit selectively receives image data from the image reading units.

6. The duplicate apparatus as claimed in claim 5, further comprising:
   a printing-output unit;
   wherein
   each of the operations-reading units includes a document reading unit and an operation unit, and
   the control unit, in response to operations on the operations-reading units, directs the document reading unit to read the image data of the documents, and directs the printing-output unit to record and output the image data read by the document reading unit to a sheet.

7. The duplicate apparatus as claimed in claim 6, further comprising:
   a selection unit that is controlled by the control unit to enable operations of operations-reading units connected to the duplicate apparatus.

8. The duplicate apparatus as claimed in claim 7, wherein the control unit disables the enabled operations-reading unit through the selection unit when the enabled operations-reading units are detected as in standby.

9. The duplicate apparatus as claimed in claim 8, wherein each of the operations-reading units includes a document detection unit configured to detect whether a document is set in the document reading unit; and
   the corresponding state detection unit serves as the document detection unit.

10. The duplicate apparatus as claimed in claim 1, further comprising:
    a recovery request unit that has an energy-saving mode for reducing electrical power in a standby state, and directs recovery of the energy-saving mode;
    wherein the switching request unit serves as the recovery request unit.

11. The duplicate apparatus as claimed in claim 1, further comprising:
    an image reading unit configured to read the image on the document fed by one of the document feeding units;
    wherein
    the control unit receives image data from the image reading unit.

12. A duplicate apparatus, comprising:
    a plurality of operations units configured to output signals corresponding to operations thereto; and
    a plurality of control units that, in response to the operations on the operations units, control reading of images on documents fed by document feeding units and recording and outputting of the images to a recording medium,
    a plurality of operations-reading units that allow operations by a user and that read image data of the documents, wherein each of the operations-reading units includes:
    a switching request unit configured to request at least one of the control units to enable said operations-reading unit, and
    a state detection unit configured to detect whether said operations-reading unit is in usage or in standby;
    wherein
    the at least one control unit directs the state detection units to detect states of enabled of the operations-reading units when a switching request of a disabled operations-reading unit requests the at least one control unit to enable said disabled operations-reading unit, and
    the control unit enables said disabled operations-reading unit when said enabled operations-reading units are detected as in standby.

13. The duplicate apparatus as claimed in claim 12, wherein the operations units are arranged at different heights.

14. The duplicate apparatus as claimed in claim 12, wherein the control units selectively receive signals from the operations units.

* * * * *